United States Patent
Décary

(10) Patent No.: US 6,965,857 B1(s)
(45) Date of Patent: Nov. 15, 2005

(54) METHOD AND APPARATUS FOR DERIVING INFORMATION FROM WRITTEN TEXT

(75) Inventor: Michel Décary, Montreal (CA)

(73) Assignee: Cogilex Recherches & Developpement Inc., Montreal (CA)

( * ) Notice: Subject to any disclaimer, the term of this patent is extended or adjusted under 35 U.S.C. 154(b) by 977 days.

(21) Appl. No.: 09/585,320

(22) Filed: Jun. 2, 2000

(51) Int. Cl.$^7$ .............................................. G06F 17/27
(52) U.S. Cl. ...................... 704/9; 704/1; 704/6; 704/10
(58) Field of Search ....................... 704/1–10; 707/1–5

(56) References Cited

U.S. PATENT DOCUMENTS

| | | | | |
|---|---|---|---|---|
| 4,864,501 A | * | 9/1989 | Kucera et al. ................. | 704/8 |
| 4,868,750 A | * | 9/1989 | Kucera et al. ................. | 704/8 |
| 4,965,763 A | * | 10/1990 | Zamora .......................... | 704/1 |
| 5,331,556 A | * | 7/1994 | Black et al. .................... | 704/9 |
| 5,587,902 A | * | 12/1996 | Kugimiya ...................... | 704/2 |
| 5,895,464 A | * | 4/1999 | Bhandari et al. .............. | 707/3 |
| 5,933,822 A | * | 8/1999 | Braden-Harder et al. ...... | 707/5 |
| 5,966,686 A | * | 10/1999 | Heidorn et al. ................ | 704/9 |
| 5,995,920 A | * | 11/1999 | Carbonell et al. ............. | 704/9 |
| 6,212,494 B1 | * | 4/2001 | Boguraev ....................... | 704/9 |
| 6,275,791 B1 | * | 8/2001 | Weise ............................. | 704/9 |
| 6,393,399 B1 | * | 5/2002 | Even .......................... | 704/257 |
| 6,601,055 B1 | * | 7/2003 | Roberts ....................... | 706/45 |
| 6,651,220 B1 | * | 11/2003 | Penteroudakis et al. .... | 715/532 |

OTHER PUBLICATIONS

Mel'cuk, Igor A. Dependency Syntax: Theory and Practice, Albany, N.Y.: The SUNY Press, 1988, P. 3-41.

Voutilainen, Atro and Heikkila, Juha. An English Constraint Grammar (ENGCG) a surface-syntactic parser of English. Published in Udo Fries, Gunnel Tottie and Peter Schneider, Eds. (1993), Creating andusing English language corpora. Rodopi: Amsterdam and Atlanta. pp. 189-199.

Voutilainen, Atro EngCG tagger, Version 2 in Tom Brondsted and Inger Lytje (Eds.) 1997, Sprog og Multimedier, pp. 1-20 as included & numbered.

Jarvinen, T., and Tapanainen, P. 1998 "Towards an implementable dependency grammar." In Processing of Dependency-Based Grammars. Montreal, Canada. S. Kahane and A. Polguere, Eds., COLING-ACL'98, Association for Computational Linguistics, Université de Montreal, pp 1-10.

Jacques Courtin et Damien Genthial (1998). Parsing with Dependency Relations and Robust Parsing. CoLing'98 Workshop on Processing of Dependency-Based Grammars, Montréal, Canada, Aug. 1998, vol. 1, pp 95-101.

Oflazer, Kemal 1999. Dependency Parsing with an Extended Finite State Approach. In Proceedings of the ACL'99, College Park, Maryland, pp. 1-15 as numbered.

Menzel, Wolfgang and Schroder, Ingo. Decision procedures for dependency parsing using graded constraints. In Sylvain Kahane and Alain Polguère, editors, Proc. ColingACL Workshop on Processing of Dependency based Grammars, Montreal, Canada, 1998, pp. 1-10 as numbered.

* cited by examiner

*Primary Examiner*—Richemond Dorvil
*Assistant Examiner*—Lamont Spooner

(57) ABSTRACT

A method and apparatus for deriving information from a textual representation of a sentence are provided, the sentence having a plurality of words. The apparatus comprises an input, a processing unit and an output. The input is for receiving data elements indicative of the textual representation of the sentence. The processing unit is operative for processing the textual representation of the sentence to derive an information record on the basis of a set of information extraction rules, the information record being indicative of a semantic representation of at least part of the sentence. The information record is then released at the output. A computer readable medium comprising a program element suitable for execution by a computing apparatus for deriving information from a textual representation of a sentence is also provided.

34 Claims, 8 Drawing Sheets

METHOD AND APPARATUS FOR DERIVING INFORMATION FROM WRITTEN TEXT

FIELD OF THE INVENTION

This invention relates to the field of natural language processing and to a method and an apparatus for automatically deriving information from written text. It is particularly applicable to natural language information extraction systems adapted to process texts such as articles, reports, memorandums, web pages and the likes in order to automatically extract desired information therefrom.

BACKGROUND OF THE INVENTION

Computers allow the storage and retrieval of an increasing amount of information. This information is in turn made available to users through local computer networks as well as global computer networks such as the Internet. This information is generally in the form of narrative texts. As the amount of information available increases, so does the difficulty in locating, extracting and making sense of relevant information. Additionally, the information contained in narrative texts is not organized in a form that can be easily processed and manipulated by a computing apparatus to extract desired information.

Natural language information extraction systems are used to extract information from written texts such as to facilitate its processing by a computing apparatus. Commonly, the process of natural language understanding can be divided in three distinct sub-processes namely morphological analysis, syntactic processing and semantic analysis.

The role of semantic analysis is to generate a logical form that describes the meaning of a sentence rather than just the syntactical link between words.

Morphological analysis is the process of assigning to each word the most likely part-of-speech (pos) or morphological tag. Words can have different forms (for example: "work", "works", "working", "worked" are different forms of the word "work") and can have different roles (for example: "work" can be a noun as in "difficult work", or a verb as in "I work hard"). Those roles are commonly referred to as part-of-speech (pos) or morphological tags. Morphological analysis can be divided into two separate stages namely morphological tagging and morphological disambiguation. Morphological tagging is the process of determining the set of possible morphological tags for a word. Morphological tagging is relatively well understood in the art. Morphological disambiguation is the process of determining the actual or most likely morphological tag of a word in a sentence.

There are two well-known classes of methods for morphological disambiguation: probabilistic and rule-based. Probabilistic methods make use of statistical measurements derived from a plurality of training sentences. Probabilistic methods generally make use of training sentences that are tagged by hand. Using well-known statistical methods, a general disambiguation process is obtained by training a computer program on these hand tagged training sentences. This method is described in Elworthy, D., "Part-of-speech tagging and phrasal tagging", Technical report, University of Cambridge Computer Laboratory, Cambridge, England, 1993 whose contents are hereby incorporated by reference. In addition to the costs of manually tagging the training sentences, the performance of probabilistic methods highly depends upon the training sentences used to derive the statistical measurements. Rule-based methods use linguistic rules written by people. In Voutilainen, Atro, "Morphological disambiguation" 1995, whose content is hereby incorporated by reference, examples of rule based methods are described. These linguistic rules examine the context in which a word appears and either assign a definite morphological tag or remove an unlikely possibility from the set of possible morphological tags. A deficiency in known rule-based approaches is that they make use of general linguistic rules that fail to address particular cases leading many ambiguities to be left unresolved.

Syntactic processing uses the information provided by the morphological analysis and attempts to identify the relationships between words (ex: subject, object, complement etc.). There are two common methods for representing the syntax of a sentence: constituency and dependency.

The overwhelming majority of parsers use constituency syntax. In constituency syntax, a sentence is depicted as a tree where each node is labeled with the type of constituent (ex: noun phrase, verb phrase, etc.) and the leaves store the individual words of the sentence. The tree itself is ordered and arcs on the tree are not labeled.

A few parsers use dependency syntax where a sentence is depicted as a tree where all nodes and leaves are associated to words in a sentence and arcs in the tree are associated to data elements indicative of relationships between words (ex: subject, object, etc.). Dependency syntax is described in Tesnière, Lucien, "Élèments de syntaxe structurale", Éditions Klincksieck, Paris, 1959; Mel'cuk, Igor A., "Dependency Syntax: Theory and Practice", State University of New York Press, Albany, 1987. The contents of these documents is hereby incorporated by reference.

A deficiency in prior art syntactic processors is that they do not provide practical domain-independent parsing capabilities. More specifically, to provide a suitable level of performance, syntactic analysis should work on complete sentences. However, complex sentences are often very long and contain various punctuation and symbols. Prior art parsers often have difficulty returning a complete parse on sentences beyond a certain level of complexity and for this reason have a poor performance when parsing complex texts such as those found in newspapers, journals and the likes.

Another deficiency in prior art syntactical processors is that they provide no practical way of deferring syntactical disambiguation to a later stage of analysis while preserving a plurality of syntactical possibilities. For example, different constituents and words can be attached at different places (ex: "receive a flu shot in a leg" compared to "receive a flu shot in a clinic"). Prior art syntactic processors attempt this disambiguation on syntactic basis alone or combined with simplified semantic tagging and only provide correct results in a low percentage of cases.

Thus, there exists a need in the industry to refine the process of natural language understanding so as to obtain an improved natural language information extraction system.

SUMMARY OF THE INVENTION

In accordance with a broad aspect, the invention provides a natural language information extraction system and method for deriving information from a textual representation of a sentence, the sentence having a plurality of words. The system comprises an input for receiving data elements indicative of the textual representation of the sentence. The system also comprises a processing unit operative for processing the textual representation of the sentence to derive an information record on the basis of a set of information extraction rules. The information record is indicative of a semantic representation of at least part of the sentence and is released at an output.

In a specific example of implementation, the processing unit includes a morphological analyser for assigning to each word in the sentence a most likely morphological tag. The processing unit also includes a syntactic processor operative for generating a parse tree group including a plurality of parse trees, each parse tree including a word of the sentence. At least one parse tree in the parse tree group includes at least two words of the sentence and a dependency data element describing a syntactic relationship between the at least two words of the sentence. The processing unit also includes an information extraction unit for processing the plurality of parse trees to generate an information record on a basis of the set of information extraction rules.

In accordance with another broad aspect, the invention provides a computer readable storage medium containing a program element suitable for execution by a computing apparatus for deriving information from a textual representation of a sentence.

In accordance with another broad aspect, the invention provides a method and apparatus for assigning a morphological tag to a given word in a sentence. The apparatus includes an input for receiving a textual representation of the sentence. The apparatus also includes a processing unit operative for processing the textual representation of the sentence to assign a respective set of morphological tags to each word in the set of words. An ambiguity class is then assigned to the given word and at least in part on the basis of a set of morphological tags associated to the given word. A most likely morphological tag to be associated to the given word is then identified on the basis of a contextual rule, the contextual rule being associated to the ambiguity class associated to the given word. A signal indicative of the most likely morphological tag associated to the given word is then released at an output.

Advantageously, making use of the contextual rules associated to respective ambiguity classes provides a morphological disambiguation process having higher precision and better coverage.

In a specific example, an ambiguity class is associated to a collection of words. The contextual rule is indicative of a data structure associating either one of a certain precursor context and a certain successor context (or both) in which a word occurs to a data element selected from the set consisting of a morphological tag, an ambiguity class, and a word. In a more specific example, identifying a most likely morphological tag to be associated to the given word includes the recursive application of a plurality of contextual rules.

In accordance with yet another broad aspect, the invention provides a computer readable medium comprising a program element suitable for execution by a computing apparatus for assigning a morphological tag to a given word in a sentence, the sentence including a set of words.

In accordance with another broad aspect, the invention provides a method and an apparatus for parsing a textual representation of a sentence to derive a parse tree group including a plurality of parse trees, the sentence including a plurality of words. The apparatus includes an input for receiving data elements indicative of the textual representation of the sentence. The apparatus also includes a processing unit for processing the data elements indicative of the sentence to generate a parse tree group. A parse tree is generated for each word in the sentence and added to the parse tree group. A new parse tree is then generated on the basis of binary dependency rules applied to a given parse tree in the parse tree group. The new parse tree is the result of a combination of the given parse tree and another parse tree from the parse tree group. The new tree is then added to the parse tree group. In a specific example, this process is recursively applied until no new tree can be generated. The apparatus also includes an output for releasing a signal indicative of the parse tree group.

In accordance with yet another broad aspect, the invention provides a computer readable medium comprising a program element suitable for execution by a computing apparatus for parsing a textual representation of a sentence to derive a parse tree group including a plurality of parse trees.

In accordance with yet another broad aspect, the invention provides a method and an apparatus for creating lexical frames from a parse tree group, the parse tree group being derived from a sentence including a plurality of words. The apparatus includes an input for receiving a parse tree group including a plurality of parse trees, at least some parse trees including at least two words and a data element indicative of the syntactic dependencies between the at least two words. The apparatus also includes a processing unit for processing the parse tree group to generate a plurality of lexical frames, each lexical frame being associated to a respective word in the sentence. A certain lexical frame in the plurality of lexical frames is associated to a certain word in the sentence and includes a list of words of the sentence other than the certain word. Each word in the list of words is associated to a dependency data element indicative of the syntactic relationship of each word in the list of words with the certain word. The apparatus also includes and output for releasing the plurality of lexical frames.

In accordance with yet another broad aspect, the invention provides a method and an apparatus for assigning semantic types to a noun phrase, the noun phrase including a set of words. The apparatus includes an input for receiving a data element indicative of a noun phrase. The apparatus also includes a processing unit operative for assigning to each word in the noun phrase a semantic type on the basis of entries in a semantics dictionary to derive a sequence of semantic typed words. The semantics dictionary includes a plurality of entries, each entry being indicative of a word associated to at least one semantic type. The sequence of semantic typed words is the processed on the basis of a set of semantic rules to derive a semantic type associated to the noun phrase, the set of semantic rules describing how to attach a semantic type to a given noun phrase. A signal indicative of the semantic type associated to the noun phrase is then released at an output.

In a specific example the set of semantic rules may include rules based on the presence of a semantic type associated to a word in the noun phrase, rules based on the capitalization of words in the noun phrase, rules based on the presence of specific words in the noun phrase and other rules.

In another specific example, the noun phrase is a first noun phrase associated to a first semantic type and the processing unit further processes a second noun phrase to derive a second semantic type associated to the second noun phrase. The first noun phrase is then combined with the second noun phrase to derive a compound noun phrase on the basis of joining rules and a third semantic type is assigned to the compound noun phrase. A signal indicative of the compound noun phrase associated with the third semantic type is released at the output.

In accordance with yet another broad aspect, the invention provides a computer readable medium comprising a program element suitable for execution by a computing apparatus for assigning semantic types to a noun phrase, the noun phrase including a plurality of words.

For the purpose of this specification, the expression "noun phrase" is used to designate a compound entity derived from the grouping of sequential occurrences of nouns and adjectives. It is to be noted that a single noun or a single adjective may be designated as a noun phrase.

Other aspects and features of the present invention will become apparent to those ordinarily skilled in the art upon review of the following description of specific embodiments of the invention in conjunction with the accompanying figures.

DETAILED DESCRIPTION

Figure 1:
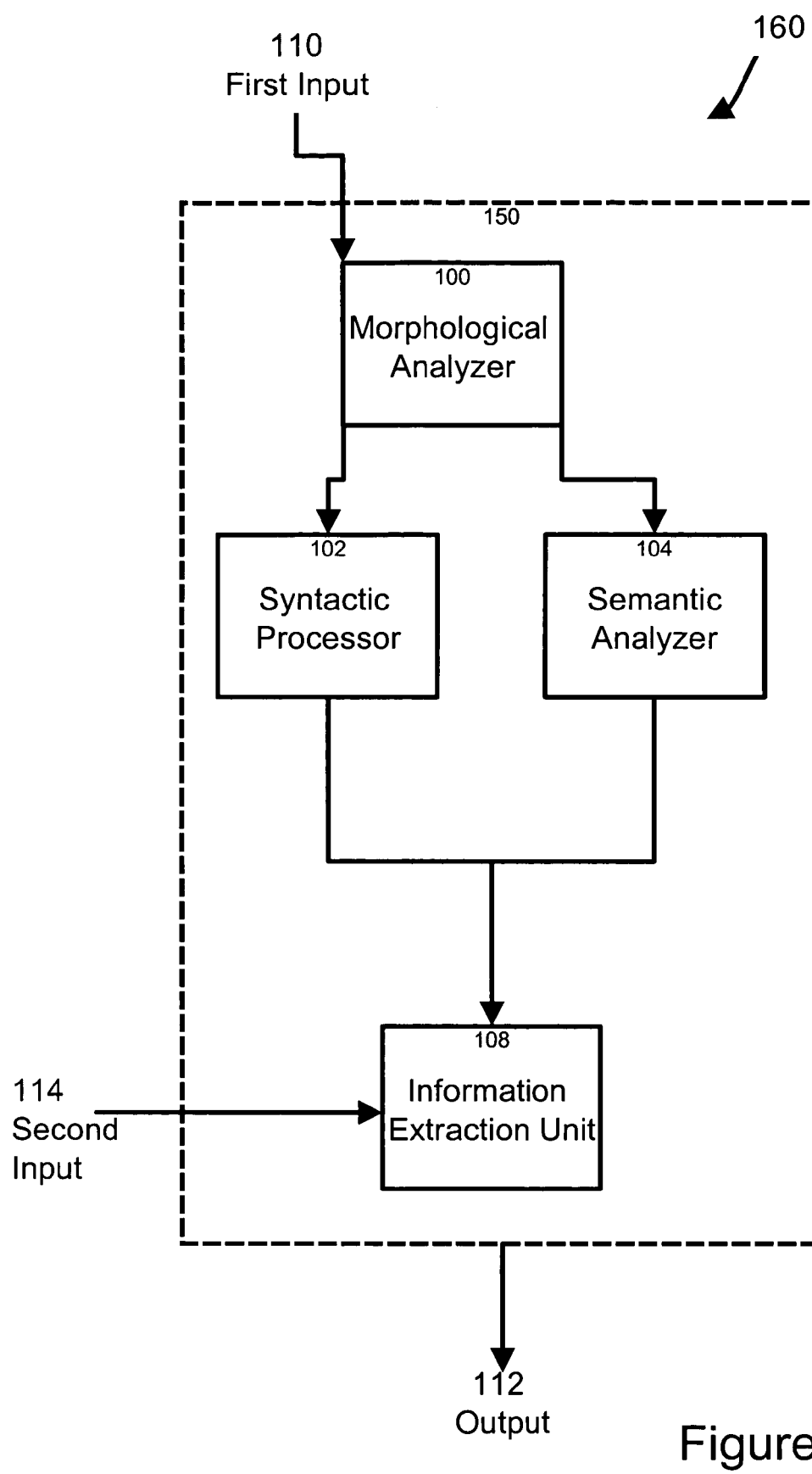
FIG. 1 is a block diagram of natural language information extraction system in accordance with a specific example of implementation of the present invention.

In accordance with a specific example of implementation, as depicted in FIG. 1 of the drawings, a natural language information extraction system 160 for deriving information from a textual representation of a sentence is provided having a first input 110, a processing unit 150 coupled to the first input and an output 112 coupled to the processing unit 150. In a non-limiting example, the natural language information extraction system 160 further comprises a second input 114 coupled to the processing unit 150 for receiving a set of information extraction rules.

The first input 110 is for receiving a signal including data elements indicative of a textual representation of a sentence. In a specific example of implementation, the sentence comprises a plurality of words arranged in a narrative format. The input 110 may be operatively coupled to an input device such as a keyboard, mouse, touch pad, IR link, data feed link or any other communication path allowing the input to received a signal including data elements indicative of a textual representation of a sentence.

The second input 114 is for receiving a set of information extraction rules defining the semantic and/or syntactic characteristics that the natural language information extraction system 160 is to seek in the sentence. In a variant, the set of information extraction rules may be fixed in the natural language information extraction system 160 such that the system 160 is configured to perform a specific information extraction function. In this variant, the second input 114 may be omitted.

The output 112 is for releasing a signal containing data elements indicative of information records, each information record containing sets of entries satisfying the set of information extraction rules received at the second input 114. The output 112 may be operatively coupled to a computer readable medium such as to allow the information records to be stored in a digital format for future processing. Alternatively, the output 112 may be operatively coupled to a display unit such as a video monitor, a printer or other suitable display device such as to allow a human user to view the information records.

The processing unit 150 is adapted to process a textual representations of a sentence received at the first input 110 on the basis of the set of information extraction rules received at the second input 114.

As depicted in FIG. 1 of the drawings, the processing unit 150 comprises a set of functional units namely a morphological analyzer 100, a syntactic processor 102, a semantic analyzer 104 and an information extraction unit 108. The functionality of each of these modules is described herein below.

The morphological analyzer 100 has an input for receiving the textual representation of a sentence. The morphological analyzer processes the sentence to determine the possible parts of speech and lemmas, herein referred to as morphological tags, for the words in the sentence and then assigns a most likely morphological tag for each individual word by applying contextual rules based on different classes of ambiguity. The morphological analyzer 100 then locates boundaries of noun phrases. The morphological analyser also has an output for releasing a labeled sequence of word/tag pairs and noun phrases corresponding to the textual representation of the sentence received at the input.

Figure 2:
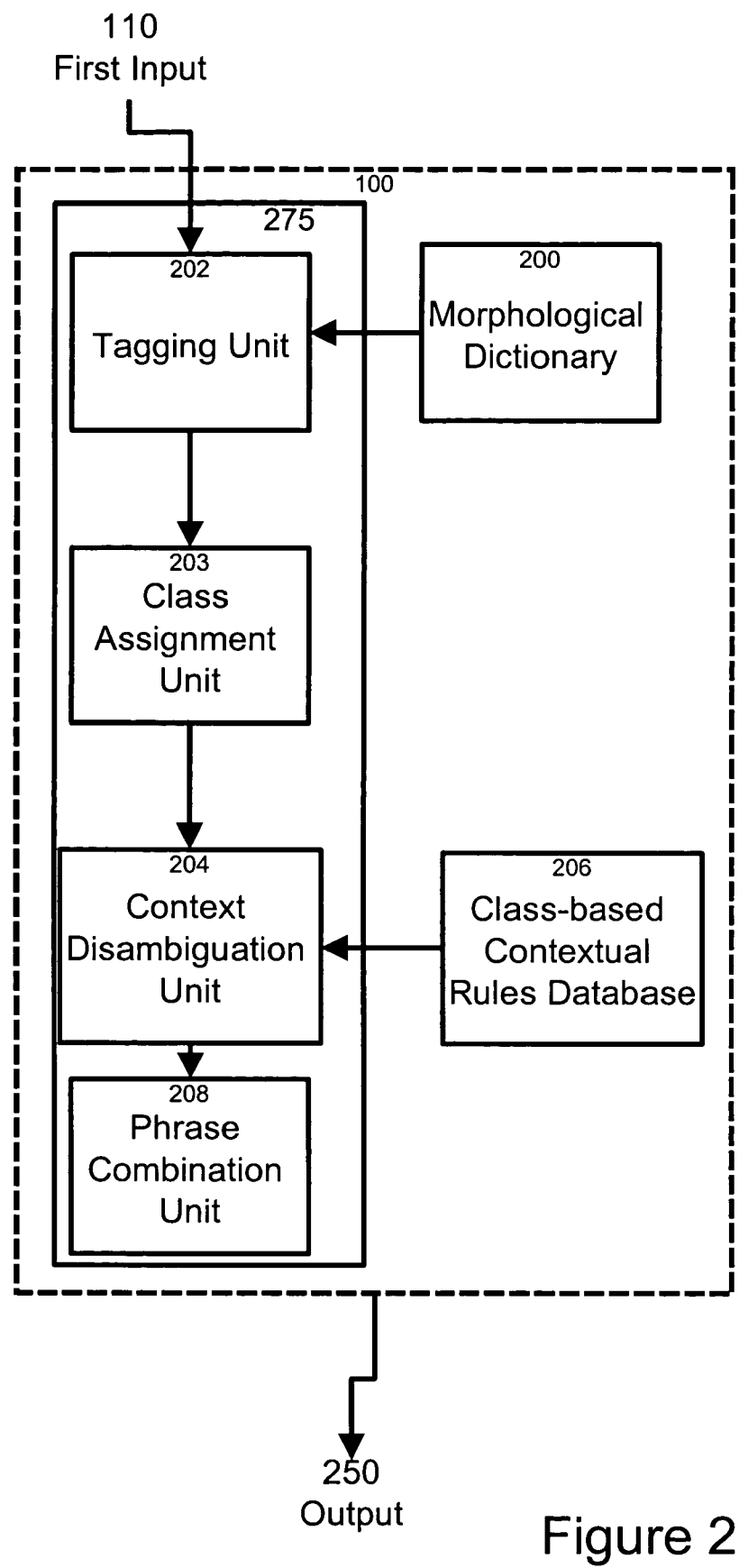
FIG. 2 is a block diagram of a morphological analyser in accordance with an embodiment of the invention.

The morphological analyzer 100 is depicted in FIG. 2 and comprises a processing unit 275 including a tagging unit 202, a class assignment unit 203, a context disambiguation unit 204 and a phrase combination unit 208. The morphological analyzer 100 also includes a morphological dictionary 200 and a class-based contextual rules database 206.

The tagging unit 202 receives the input text 110 and assigns a list of potential morphological tags to each word in the input text 110. In a specific example of implementation, the tagging unit 202 is coupled to a morphological dictionary 200 having a data structure storing a plurality of entries. Each entry in the data structure corresponds to a word associated to a plurality of morphological tags. The data structure is such that it allows extracting a list of possible morphological tags on the basis of a certain word. In a specific interaction, the tagging unit 202 interacts with the morphological dictionary 200 to search for a given word in the text and extract the associated list of morphological tags. The result is a sequence of morphological entities, each morphological entity including a word and its associated morphological tag list. The sequence of morphological entities is then released from the tagging unit 202. Other methods for assigning a list of potential morphological tags to a word may be used here without detracting from the spirit of the invention.

The class assignment unit 203 assigns to each morphological entity generated by the tagging unit 202 an ambiguity class. The ambiguity class is determined on the basis of the morphological tag list. In a specific example, ambiguity classes are associated to each possible combination of morphological tags. Ambiguity classes can also be associated to a specific word or to any arbitrary collection of words. For instance, in a specific example, all nouns ending in "ing" which can also be verbal "ing" forms (such as "learning" or "engineering") are assigned to the ambiguity class N-ING. The output of the class assignment unit 203 is a sequence of data entities, each data entity including a word, its associated morphological tag list and an ambiguity class. The skilled person in the art will readily observe that when there is a one-to-one correspondence between a certain morphological tag list and an ambiguity class, each data entity need not store both the morphological tag list and an ambiguity class and may simply store the ambiguity class, for example. The morphological tag list can then be derived from the ambiguity class.

In a possible variant, the ambiguity classes may be stored in the morphological dictionary 200 and associated to respective words. When the tagging unit 202 extracts the list of possible morphological tags for a given word from the morphological dictionary 200, the ambiguity class is also extracted. In this variant, the class assignment unit 203 can be omitted.

The context disambiguation unit 204 receives the sequence of data entities generated by the class assignment unit 203 and processes each word to derive the most likely morphological tag for each given word.

In a specific example of implementation, the context disambiguation unit 204 is coupled to a class-based contextual rules database 206 having a data structure storing a plurality of entries. Each entry in the data structure corresponds to an ambiguity class and stores a list of contextual rules. In a specific example, each contextual rule associates a precursor context, a successor context or a given combination of precursor and successor contexts in which a word occurs to either a morphological tag, an ambiguity class, or a word. The contextual rules may comprise other conditions such as semantic properties, morphological properties and other morpho-syntactic conditions between words in the context of the rule. The data structure is such that it allows extracting a list of contextual rules on the basis of an ambiguity class. In a specific interaction, the context disambiguation unit 204 interacts with the class-based contextual rules database 206 to search for an ambiguity class and extract the associated list of contextual rules.

Continuing the specific example for the ambiguity class N-ING, a list of contextual rules is assigned to the N-ING ambiguity class. In other words, for each word associated to the ambiguity class N-NING, the context disambiguation unit 204 extracts a corresponding list of contextual rules. Below is an excerpt of the rules for the N-ING class in a specific example:

Class N-ING Contextual Rules

| # | Left1 | Left2 | Right1 | Right2 | Tag or Class |
|---|---|---|---|---|---|
| 1 | * | * | Conjunction | NOUN | NOUN |
| 2 | * | * | NOUN (Proper) | * | ING |
| 3 | * | NOUN (Plural) | * | * | ING |
| 4 | * | * | Adverb | * | ING |
| 5 | * | * | Determinant | * | ING |
| 6 | * | * | VERB | * | NOUN |
| 7 | * | Of | NOUN | * | Adjective |

As shown in the table above, the first rule indicates that a "N-ING" word followed by a conjunction and then a noun is a noun "ing" form (ex: "engineering and math") and should be assigned morphological tag NOUN. In another example, an ambiguity class may be defined as the NOUN-VERB ambiguity class. The NOUN-VERB class comprises words like "Engineer" which may be a noun or a verb. The list of contextual rules associated to the NOUN-VERB class is applied to distinguish between "Engineer" as a verb and "Engineer" as a noun. The list of contextual rules associated to the NOUN-VERB ambiguity class may therefore be different than the list of contextual rules associated to the N-ING ambiguity class. The above table is shown for the purpose of illustration only and should not be construed as limiting.

The context disambiguation unit 204 then applies the contextual rules from the extracted list of contextual rules to the word. In a specific example, the list of contextual rules is applied to words in the input sentence going from left to right in order to identify the most likely morphological tag for each word. Contextual rules are applied recursively and are reapplied until no changes occur in a morphological tag and in an ambiguity class assignment for any word in a sentence during one complete pass. The context disambiguation unit 204 then releases a sequence of word-tag pairs.

Advantageously, assigning ambiguity classes to words and making use of class-based contextual rules allows an improvement in the morphological disambiguation process by allowing contextual rules to be tailored to specific types of words or even single words. For example, ambiguity classes can be defined for any arbitrary morphological tag combination including defining an ambiguity class comprising single (1) word. For example, in a specific example, there is an ambiguity class that applies only to the word "will" which may be the only word in English that can be either a Noun or a Modal.

The phrase combination unit 208 receives the sequence of word-tag pairs released by the context disambiguation unit 204 and processes them to identify sequential occurrences of nouns and adjectives. These sequences are grouped into compound entities herein referred to as a noun phrases. It is to be noted that a single noun or a single adjective may be designated as a noun phrase.

The morphological analyser 100 then releases at the output 250 a labeled sequence of word/tag pairs and noun phrases corresponding to the textual representation of the sentence received at the input.

Figure 3:
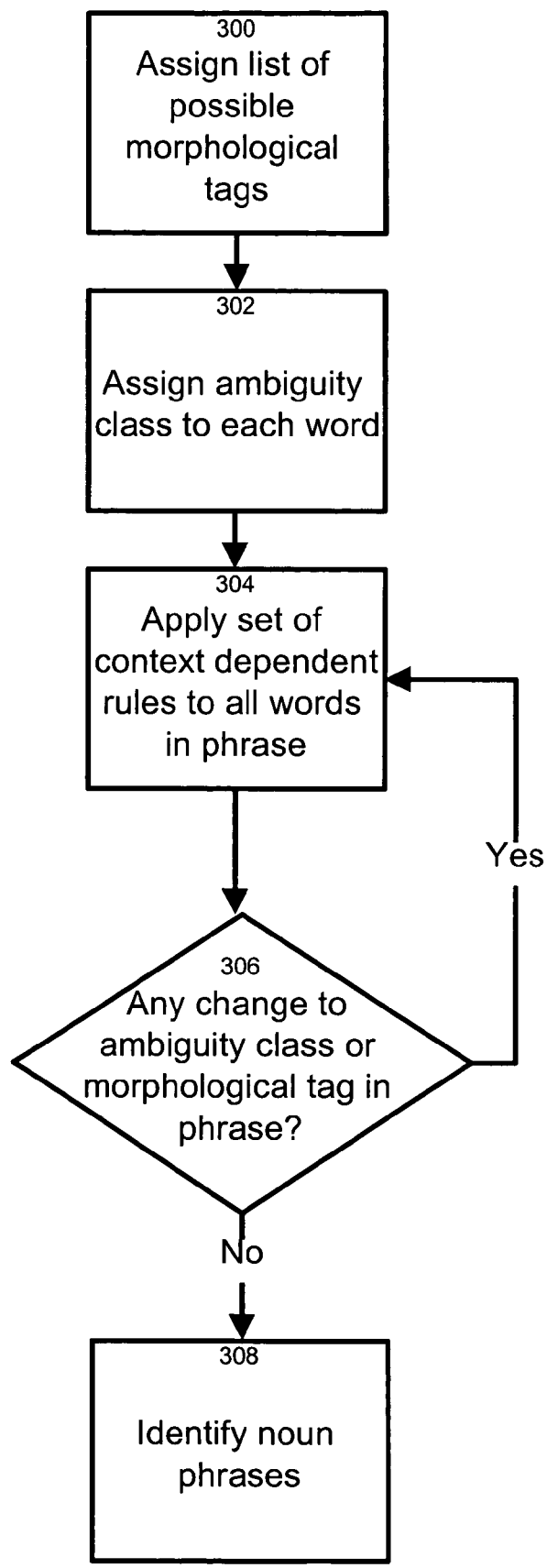
FIG. 3 is a flow chart depicting the functionality of the morphological analyser of FIG. 2.

The method implemented by the morphological analyzer 100 is depicted in FIG. 3 of the drawings.

The semantic analyzer 104 is for assigning semantic types to noun phrases, each noun phrase including one or more words. The semantic analyzer comprises an input for receiving a data element indicative of a certain noun phrase, a processing unit and an output for releasing a signal indicative of the certain semantic type associated to the certain noun phrase. Generally speaking, the semantic analyzer 104 receives a labeled sequence of word/tag pairs and noun phrases generated by the morphological analyzer 100 and attempts to generate a logical form including data element describing the meaning of a sentence (rather than just the syntactical link between words). The semantic analyzer releases the words and noun phrases in the textual representation of a sentence. The semantic analyzer is operative to assign to at least some noun phrases a data element indicative of a semantic type.

Figure 4:
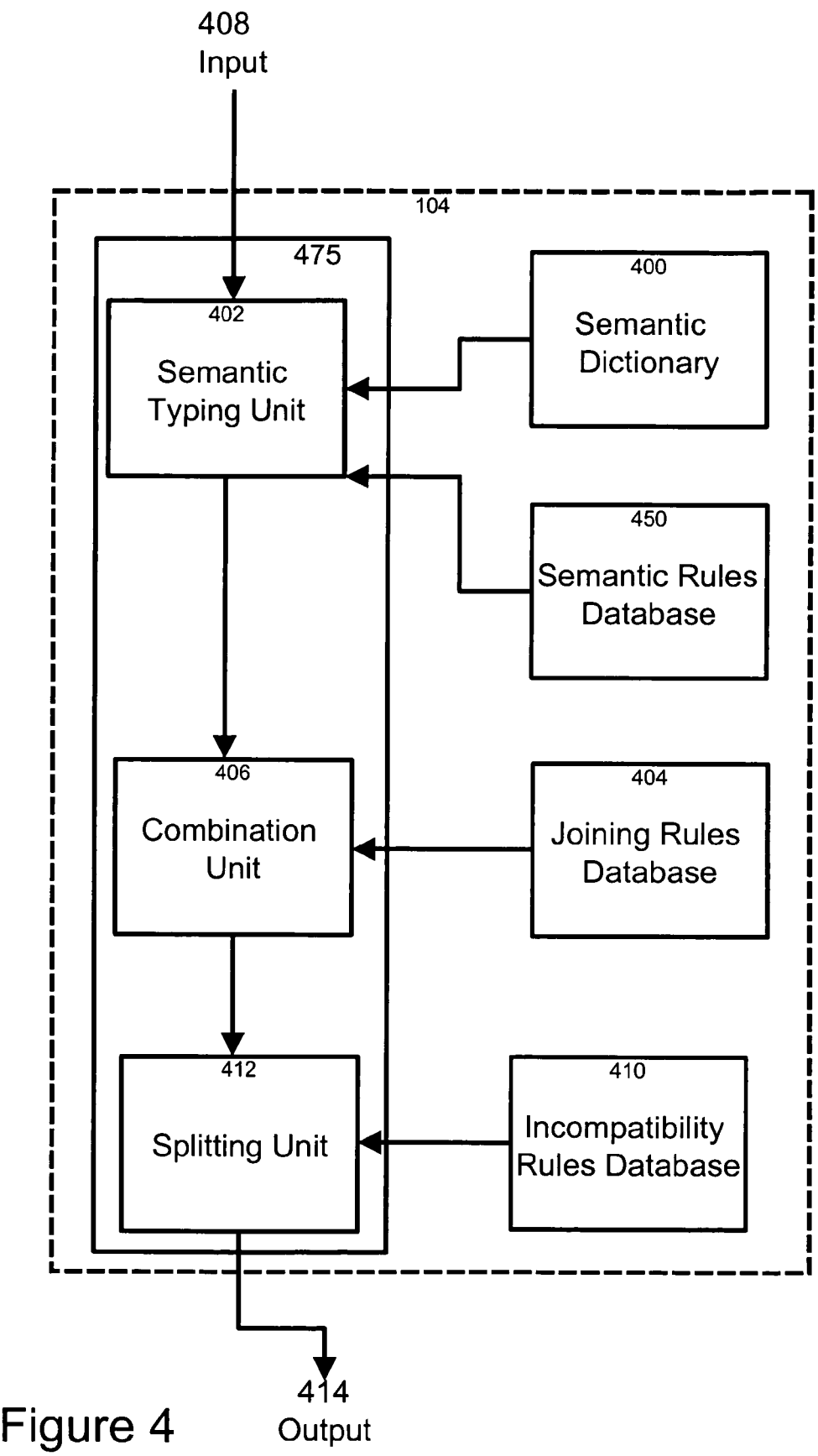
FIG. 4 is a block diagram of a semantic analyser in accordance with an embodiment of the invention.

The semantic analyzer 104, in accordance with a specific example of implementation, is depicted in FIG. 4. As shown the processing unit 475 includes a semantic typing unit 402, a combination unit 406 and a splitting unit 412. The semantic analyzer 104 also comprises a semantic dictionary 400, a semantic rules database, a joining rules database 404 and an incompatibility rules database 410.

As a variant, the semantic typing unit 402 assigns a semantic type to some noun phrase in the signal received at the input 408. In order to assign a semantic type to a noun phrase, each word in the noun phrase is first assigned a semantic type. In a specific example of implementation, the semantic typing unit 402 is coupled to a semantic dictionary 400 having a data structure storing a plurality of entries. Each entry in the data structure corresponds to a word associated to a semantic type. Specific example of entries of semantic types are listed below:

| Word | Semantic type |
| --- | --- |
| Cancer | DISEASE |
| BRAIN | BODY PART |
| ENGINEER | OCCUPATION |

It is to be noted a single word may be associated to a plurality of semantic types without detracting from the spirit of the invention.

The data structure is such that it allows extracting a semantic type on the basis of a certain word. In a specific interaction, the semantic typing unit 402 interacts with the semantics dictionary 400 to search for a given word in the text and extract the associated semantic type. Words not appearing in the semantics dictionary 400 are processed by a default procedure. The default procedure may, for example, assign the semantic type UNKNOWN or alternatively assign no semantic type to the word. The result is a sequence of semantic typed words.

The semantic typing unit 402 then processes each noun phrase by applying a set of semantic rules to derive a certain semantic type associated to each noun phrase. The set of semantic rules describes how to attach a semantic type to a noun phrase. In a specific example, the semantic rules for assigning semantic types to a noun phrase are sensitive to certain conditions within the noun phrase namely:

(a) the semantic types for individual words;
(b) the capitalization of individual words;
(c) the presence of specific words.

For instance, in a specific example, the following semantic rules allow to type a noun phrase as a "disease":

DISEASE –*M M:Disease –M:DiseasePostModifier

The above semantic rule states that a noun phrase can be typed as a DISEASE if it contains:

(a) optionally (–) any number (*) of words without capitalization requirements (M); followed by
(b) one word with the semantic type DISEASE (i.e. words such as inflammation, diabetes, etc.); followed optionally by
(c) a word with the semantic type DiseasePostModifier.

In a specific example of implementation, the semantic typing unit 402 is coupled to a semantic rules database 450 having a data structure storing a plurality of semantic rules.

In a variant, the semantic rules database 450 and the semantic dictionary 400 are specific to a particular area or art. For example, if the natural language information extraction system is to be used essentially for processing medical records, at least some of the semantic rules and some of the semantic types can be tailored to words and noun phrases typically found in the medical arts.

The combination unit 406 processes the output of the semantic typing unit 402 to selectively combine noun phrases into compound noun structures on the basis of joining rules. The combination unit 406 then assigns a new semantic type to the compound noun phrase and releases the compound noun phrase with the new semantic type at its output. In a specific example of implementation, the combination unit 406 is coupled to a joining rules database 404 having a data structure storing a plurality of joining rules that are recursively applied to the noun phrases. In a very specific example of implementation, the joining rules applied when making a decision as to whether to join a first and a second noun phrase into a compound noun phrase are based on:

(a) semantic types associated with either or both noun phrases;
(b) semantic types associated to individual words in either or both noun phrases, and,
(c) the presence of specific words in either one of the noun phrases.

Such rules then assign a semantic type to the larger noun phrase resulting from the combination of the 2 noun phrases.

For instance, in a specific example, the following joining rule would allow different noun phrases to be joined to create a larger "disease" noun phrase:

DISEASE=DISEASE of=BodyPart

The above joining rule indicates that if a noun phrase of the type DISEASE (such as "Cancer") is followed by "of" and by a noun phrase of the type BodyPart (such as "lower intestine"), the two noun phrases can be joined to form a larger noun phrase of type DISEASE (in this case "Cancer of lower intestine").

The splitting unit 412 processes the output of the combination unit 406 to divide noun phrases into two or more noun phrases when there are incompatibilities within a noun phrase. In a specific example of implementation, the splitting unit 412 is coupled to an incompatibility rules database 410 having a data structure for storing a plurality of incompatibility rules which are recursively applied to the noun phrases. For example a noun phrase can be split by applying rules based on the occurrence of 2 incompatible semantic types within the same noun phrase. Advantageously, providing a splitting unit allows separating concepts that have been joined by mistake as can occur in the case of missing punctuation or irregular textual formatting.

The syntactic processor 102 receives the labeled sequence of word/tag pairs and noun phrases generated by the morphological analyzer 100 and attempts to identify the relationship between words (ex: subject, object, complement etc.). The process of identifying the relationship between the words in a sentence is commonly known as parsing the sentence.

The syntactic processor 102 generates a parse tree group comprising a plurality of parse trees. More specifically, the syntactic processor 102 is operative for generating a parse tree for each word in the sentence and adding each generated parse tree to the parse tree group. The syntactic processor 102 then generates a new parse tree on the basis of binary dependency rules applied to a given parse tree in the parse tree group. The new parse tree results from a combination of the given parse tree and another parse tree from the parse tree group. The new parse tree is then added to the parse tree group.

The syntactic processor 102, in accordance with a specific example of implementation, applies methods of dependency syntax to perform automatic sentence parsing. In theoretical dependency syntax, a sentence is depicted as a parse tree where all nodes and leaves are associated to words in the sentence and arcs in the tree are associated to data elements indicative of dependency relationships between words (ex:

subject, object, etc.). The general theory of dependency syntax is described in Tesnière, Lucien, "Éléments de syntaxe structurale", Éditions Klincksieck, Paris, 1959; Mel'cuk, Igor A., "Dependency Syntax: Theory and Practice", State University of New York Press, Albany, 1987. The contents of these documents is hereby incorporated by reference.

Advantageously, making use of dependency syntax in automatic sentence parsing provides a syntactic processor having improved parsing capabilities by allowing syntactic relationships to be explicitly indicated in the a parse tree. The majority of prior art syntactic processing devices make use of constituent syntax where relationships between the words have to be deduced by exploring the parse tree.

As a variant, words separated by certain punctuation are processed separately by the syntactic processor 102 to generate separate parse tree groups. In this way, the parsing of very complex sentences is divided in two much simpler and independent processes.

Figure 5:
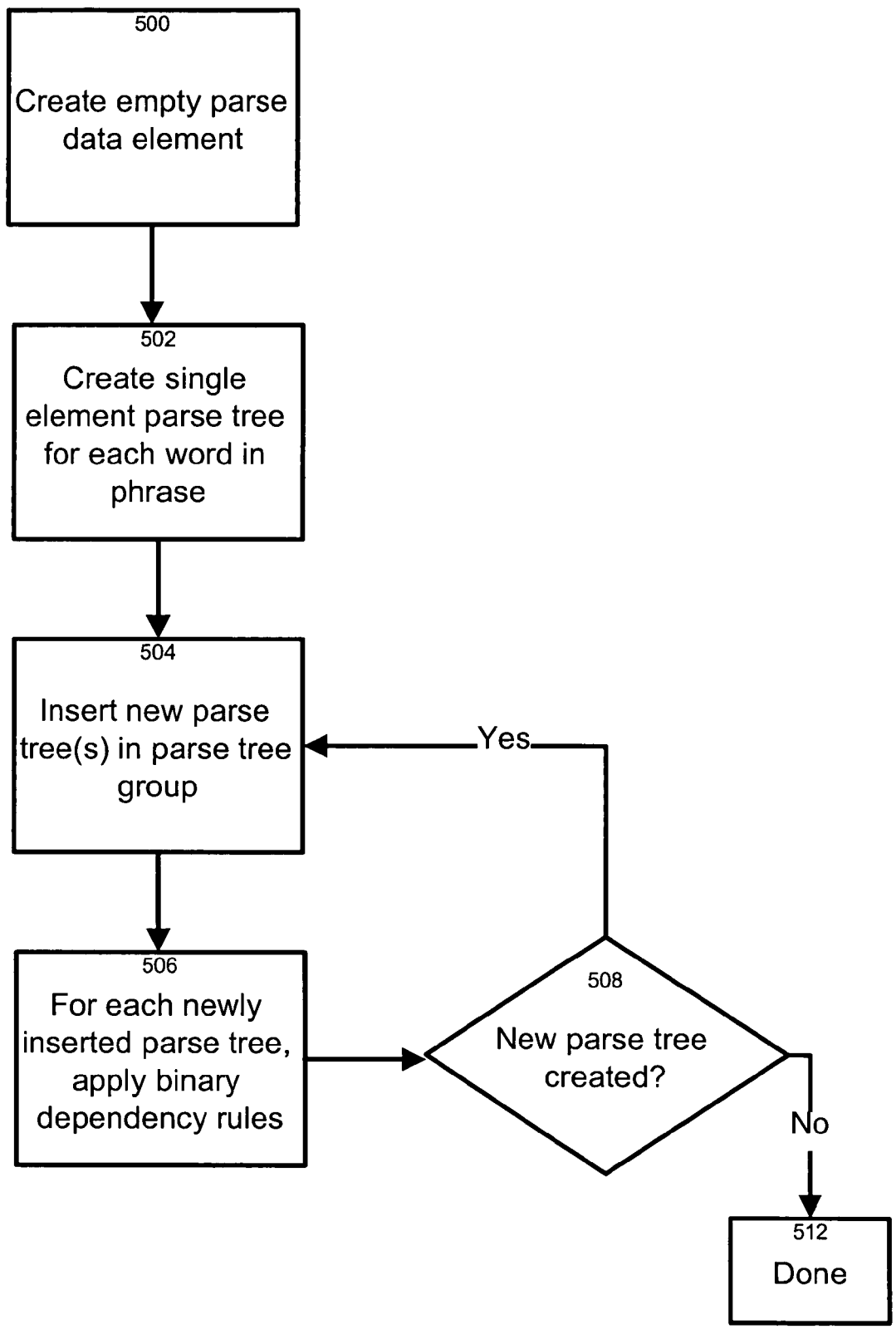
FIG. 5 is a flow chart depicting the syntactic processing of a sentence in accordance with an embodiment of the invention.

The syntactic processor 102 will be best understood in connection with the flow chart of FIG. 5. For the purpose of illustration, the parse trees in the parse tree group includes a root node associated to a word (or noun phrase) of the sentence. For each sentence, a parse tree group comprising a set of parse trees is obtained by first creating an empty parse tree group in step 500. Following this at step 502, for each word in the sentence, a parse tree with one (1) element is created and inserted into the parse tree group at step 504. At step 506, binary dependency rules are applied to each parse tree newly inserted in the parse tree group. The binary dependency rules applied attempt to create a new parse tree by combining the newly inserted parse tree with any other parse tree having a root node associated to a word that is a precursor or a successor of the word associated to the root node of the newly inserted tree. The new parse tree includes the words of the two parse trees as well as a data element indicating the dependency relationship of the two parse trees.

More specifically, a given parse tree includes a set of word covering a first range of consecutive words in the sentence. This given parse tree may be combined with a second parse tree in the parse tree if certain conditions are met. For example, the second parse tree includes a second set of words covering a second range of consecutive words in the sentence the given parse tree may be combined with the second parse tree if the second range of consecutive words is either the immediate precursor of the immediate successor of the first range of consecutive words in the sentence.

In a specific example of implementation, if the current parse tree includes a set of words spanning a current range of consecutive words of the sentence, dependency rules are expressed in terms of:
(a) the morphological tag of the word at the head of a first parse tree, the first parse tree including a set of words spanning a first range of consecutive words that is the immediate precursor of the current range of consecutive words;
(b) the morphological tag of the word at the head of a second parse tree, the second parse tree including a set of words spanning a second range of consecutive words that is the immediate successor of the current range of consecutive words;
(c) the name of the resulting dependency if the current parse tree is combined with the first parse tree or the second parse tree;

(d) which of the first parse tree (or second parse tree) and current parse tree should become the head of the new parse tree; and,
(e) conditions on the presence or absence of certain dependencies inside each of the parse trees.

Below is an example of a dependency rule:

| I-OBJECT | MANY | PP | Prep(*) | H1 |
|---|---|---|---|---|
| 1:HAS:SUBJECT | 1:HAS:AUX | 2:HAS: PREPCOMP | ~1:HAS:ING-COMP | |

The above rule states that a first parse tree with a past participle (PP) word as head of the parse tree followed by a second parse tree with a preposition (Prep(*)) as head can lead to a new parse tree with the first parse tree as the head (Hi) and linked to the second parse tree with the relation "indirect object" (I-OBJECT) as long as (a) the past participle has a subject, (b) the past participle has an auxiliary verb, (c) the preposition has a complement, and, (d) the past participle does not have already an "ing" complement. Also the relation I-OBJECT can appear many times (MANY) for the same head.

This rule would apply to the sentence "Results are expected in two days" at the moment the two following parse trees are present:

TREE 1:

expected

. . (SUBJECT Results)

. . (AUX be)

TREE 2:

in

. . (PREPCOMP days)

. . . . (DETERMINER two)

After application of the example rule, the following tree would be added:

TREE 3:

expected

. . (SUBJECT Results)

. . (AUX be)

. . (I-OBJECT in)

. . . . (PREPCOMP days)

. . . . . . (DETERMINER two)

In another specific example, the parse of the sentence "Functional changes are early indicators of growth in clonal development of the hematopoietic system but they equally indicate signaling for specific actions of differentiated cells" returned a parse tree group including of many hundreds of parse trees. Below are 3 parse trees from this set:

are

. . (SUBJECT Functional changes)

. . (D-OBJECT early indicators

. . . . (NCOMP of

. . . . . . (PREPCOMP growth

```
........ (NCOMP in
.......... (PREPCOMP clonal development
............ (NCOMP of
.............. (PREPCOMP hematopoietic system
................ (DETERMINER the))))))))
are
.. (SUBJECT Functional changes)
.. (D-OBJECT early indicators)
.. (I-OBJECT of
.... (PREPCOMP growth))
.. (I-OBJECT in
.... (PREPCOMP clonal development
...... (NCOMP of
........ (PREPCOMP hematopoietic system
.......... (DETERMINER the)))))
indicate
.. (SUBJECT they)
.. (ADVERBIAL equally)
.. (ING-COMP signaling
.... (I-OBJECT for
...... (PREPCOMP specific actions))
.... (I-OBJECT of
...... (PREPCOMP differentiated cells)))
```

The first and second parse trees use exactly the same words but different attachments. The third parse tree covers a different part of the sentence.

At step 508, the system determines if the application of the dependency rules at step 506 resulted in the creation of a new parse tree. In the affirmative, the system returns to step 504, where it inserts the newly created tree in the parse tree group and the processing continues. If no new parse tree is created, condition 508 is answered in the negative and the parsing of the sentence is completed.

The result of the application of the dependency rules is not a single parse tree but a parse tree group including a plurality of parse trees where a plurality of possible attachments are preserved.

An advantage of the syntactic processor in accordance with the spirit of the invention is that it allows the gathering of syntactical information for the words in a sentence by generating a plurality of parse trees for parts of the sentence and for the whole sentence rather than a single tree covering only the whole sentence.

The number of parse trees in the parse tree group grows exponentially with the number of words in the sentence. In a specific example of implementation, in order to reduce combinatorial explosion of parse trees, certain restriction mechanisms are used to determine whether a tree should be inserted into the parse tree group. At step 508, the system applies insertion decision rules to determine whether the newly crated parse tree is to be added to the parse tree group. In a very specific example, insertion decision rules include the following rule:

(a) before a parse tree is inserted, the parse tree group is checked for any occurrence of an identical parse tree. If an identical parse tree is found, the new parse tree is not inserted;

In addition, sequential combinations of nouns and adjectives are treated as one word.

Advantageously, applying insertion decision rules allows the number of parse trees in the parse tree group to be limited thereby reducing the memory requirements and the computing requirements of the overall system. It is to be noted that the application of insertion decision rules may be omitted and all possible attachments and all possible parse trees preserved without detracting from the spirit of the invention.

Yet another advantage of the syntactic processor in accordance with the spirit of the invention is that it permits maintaining information about the relationships of the words in the sentence even if the entire sentence could not be resolved beyond a certain point (because of a grammatical incongruity for example). In other words, even if the parsing of a sentence could not be completed beyond a certain point, the parse trees for the portions of the sentence are preserved, thus allowing information to be obtained in spite of this failure to complete the parse.

The information extraction unit 108 receives the parse tree group and generates therefrom a plurality of information records on the basis of information extraction rules.

In a specific example of implementation, in addition to the parse tree group received from the syntactic processor 102, the information extraction unit 108 further receives from the semantic analyzer 104 noun phrases associated to respective semantic types and from the second input 114 information extraction rules. The information extraction rules define the semantic and/or syntactic characteristics that the information extraction unit 108 is to seek in the parse tree group. The information extraction rules may be stored in the information extraction unit 108 such that the latter is configured to perform a specific information extraction function. In this variant, the second input 114 may be omitted.

In a very specific example of implementation, the information extraction rules in the set of information extraction rules include data elements indicative of parse tree patterns. The information extraction unit 108 is operative to process the plurality of parse trees in the parse tree group to extract parse trees matching the parse tree patterns.

In a specific example of implementation, the set of information extraction rules are in the form of semantic frames containing information related to:

a) the name of the resulting information record that will be generated when a match to a given parse tree pattern occurs;

b) the specific word OR noun phrase semantic type to be found as a head of a parse tree, and c) a list of dependants to be found for this head in the parse tree. Each dependant is either obligatory or optional and is expressed as:
   i) a dependency name to be found in the parse tree;
   ii) the name of the field within the information record for this element;
   iii) an optional noun phrase semantic type for this dependant.

Information records are obtained by matching semantic frames to trees in the parse tree group. The information extraction unit 108 releases a list of information records with words or noun phrases from the original sentence attributed to different fields within the records.

A specific example will better illustrate the above-described process. Suppose the semantic frame defining a parse pattern received at input 114 has the following form:

| TREATMENT | | | |
|---|---|---|---|
| Treat | V | | |
| SUBJECT | N | DISEASE: | DISEASE |
| *I-OBJECT (with):PREPCOMP | N | MEDICATION: | MEDICATION |
| *I-OBJECT (by):INGCOMP (use) | N | MEDICATION: | MEDICATION |

This semantic frame states that an information record with the name TREATMENT can be created if a parse tree in the parse tree group with the following properties can be found:

the head of the parse tree is the verb (V) Treat the subject of "Treat" has the semantic type DISEASE (this will be put in the field DISEASE of the record).

furthermore, if there also exists an indirect object with the word "with" or the words "by using" AND the complement is of the type MEDICATION this will be added as a field name MEDICATION in the information record.

In a first form of implementation, the information extraction unit 108 processes each parse tree in the parse tree group on the basis of the set of information extraction rules to generate information records.

As a variant, in order to reduce the complexity of information extraction from the parse tree group, the information extraction unit 108 is operative to summarize the set of trees as a list of lexical frames.

Figure 6:
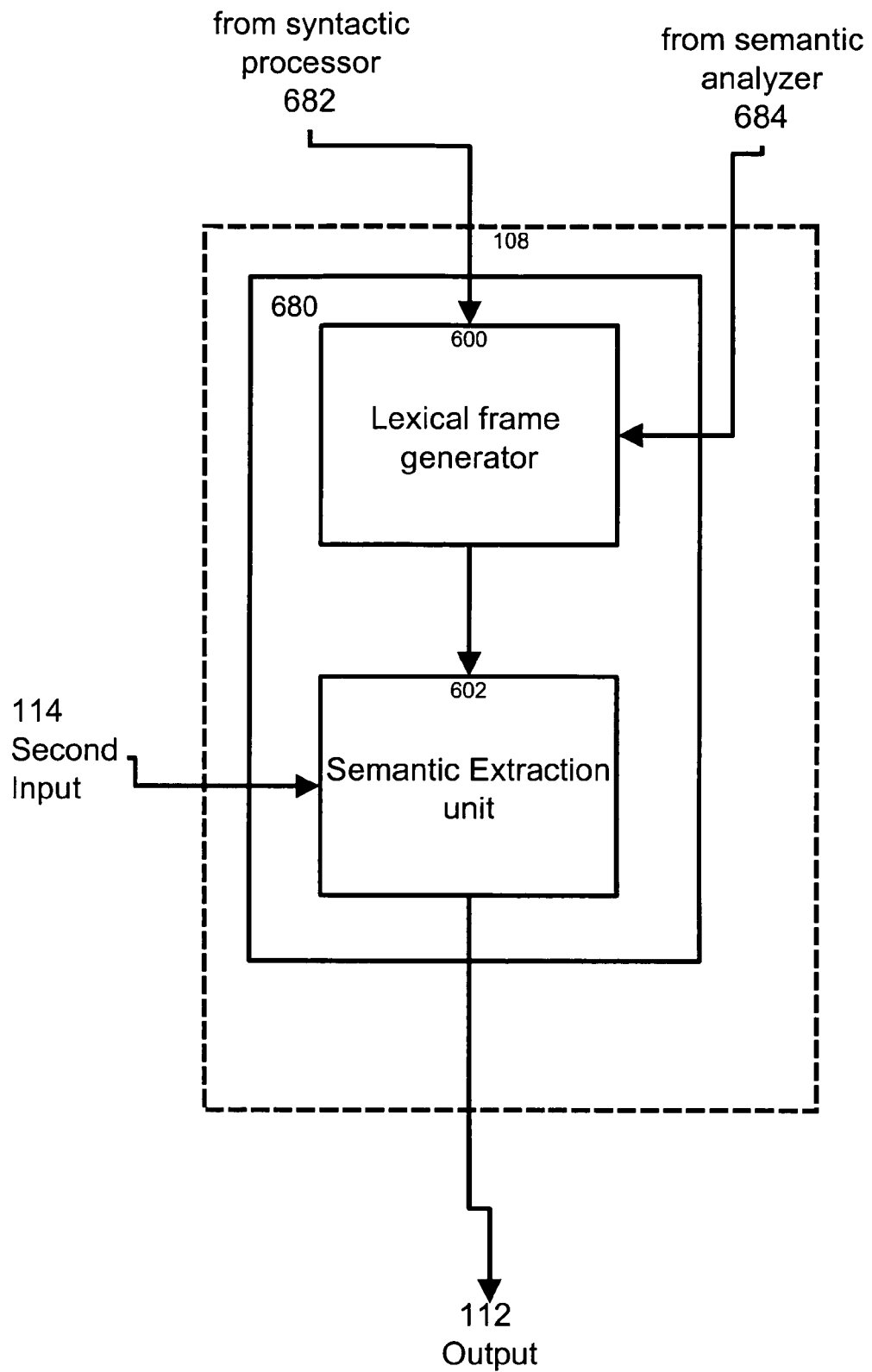
FIG. 6 is a block diagram of an information extraction unit in accordance with a variant.

The information extraction unit 108, in accordance with this variant, will be best understood with reference to FIG. 6 of the drawings. In accordance with this variant, the information extraction unit 108 includes an input 682 for receiving a parse tree group including a plurality of parse trees, at least some parse trees including a set of words and data elements indicative of the syntactic dependencies between the set of words. The information extraction unit 108 also includes a processor 680 having a lexical frame generator 600 and a semantic extraction unit 602. The information extraction unit 108 also includes an output for releasing the plurality of lexical frames.

Figure 7:
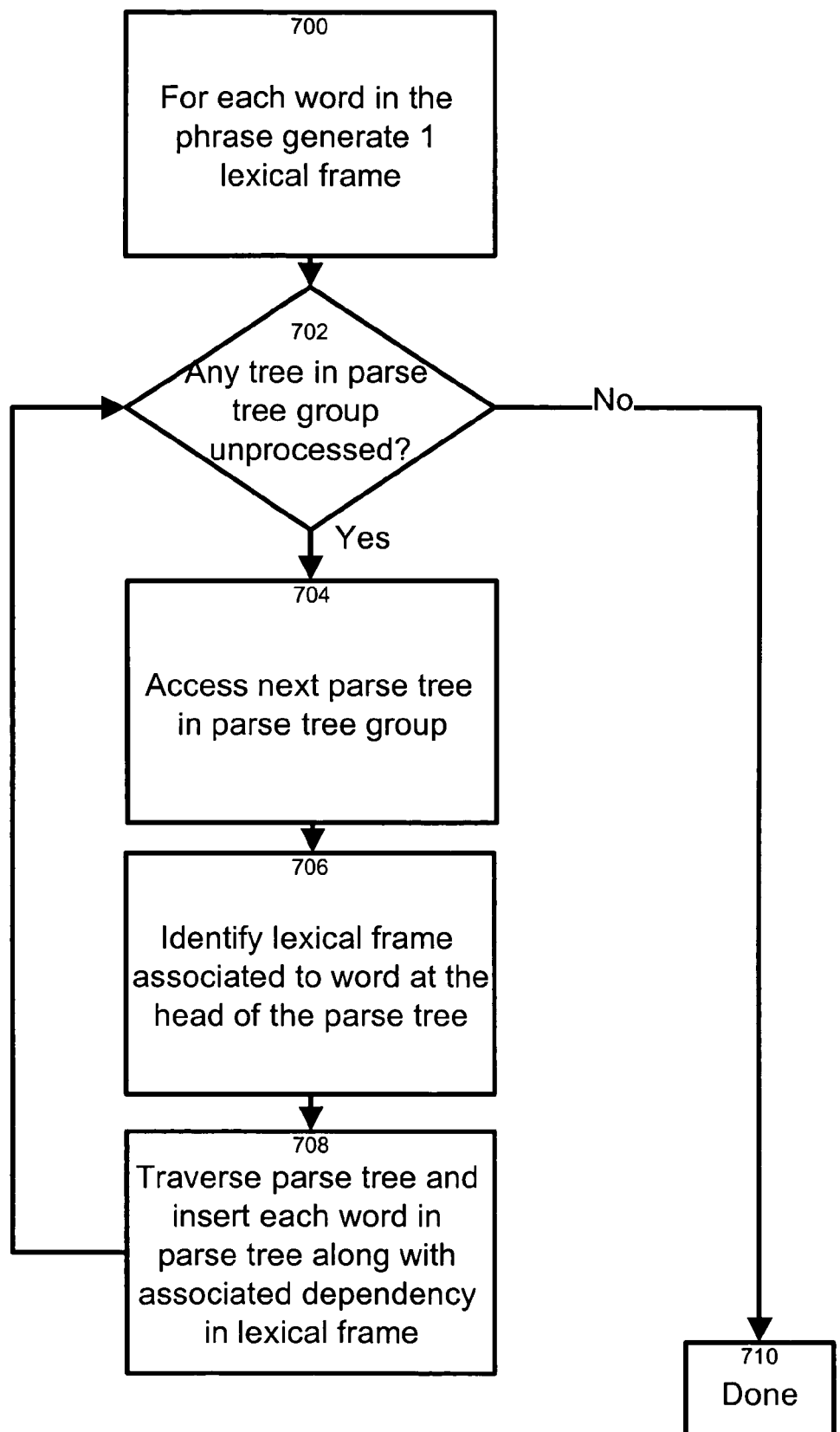
FIG. 7 is a flow chart depicting the lexical frame generation process in accordance with an embodiment of the invention.

The lexical frame generator 600 processes the parse tree group generated by the syntactic processor to derive a plurality of lexical frames, each lexical frame being associated to a respective word in the sentence. Each lexical frame comprises a list of words of the sentence, each word in the list of words being associated to a dependency data element indicative of the syntactic relationship of the word with the word associated with the lexical frame. More specifically, as depicted in FIG. 7, at step 700 the lexical frame generator 600 generates one (1) lexical frame for each word in the sentence. Following this, if condition 702 is answered in the affirmative and unprocessed parse trees remain in the parse tree gourp, the next unprocessed parse tree is extracted from the parse tree group at step 704 and the extracted parse tree becomes the current parse tree. The lexical frame generator then identifies at step 706 the lexical frame associated to the word located at the head of the current parse tree from the list of lexical frames. At step 708, the current parse tree is traversed and each word is inserted in the lexical frame along with the associated dependency. Once the current parse tree has been processed, the lexical frame generator 600 returns to step 702 and the process is repeated until all parse trees in the parse tree group have been processed.

Each lexical frame generated by the above described process includes a plurality of possible dependencies between a word and any other word in the sentence for which a dependency relation exists somewhere in the parse tree group. Optionally, the lexical frames may also include data elements indicative of semantic types associated to respective noun phrases. A specific example will better illustrate the structure of the lexical frames. Using the sentence, "Functional changes are early indicators of growth in clonal development of the hematopoietic system but they equally indicate signaling for specific actions of differentiated cells", possible lexical frames for the sentence may be as follows:

| Word Number | Morphological Category or Slot Name | Word | Words Number for dependent word |
|---|---|---|---|
| 1 | N | Functional changes | |
| 2 | V | Be | |
| | Subject | Functional changes | 1 |
| | What | Early indicators | 4 |
| | Of | Growth | 6 |
| | In | Clonal development | 9 |
| | Of | Hematopoietic system | 13 |
| 4 | N | Early indicators | |
| | of | Growth | 6 |
| | in | Clonal development | 9 |
| 5 | Prep | Of | |
| 6 | N | Growth | |
| | in | Clonal development | 9 |
| | of | Hematopoietic system | 13 |
| 7 | Prep | In | |
| 9 | N | Clonal development | |
| | of | Hematopoietic system | 13 |
| 10 | Prep | Of | |
| 11 | * | The | |
| 13 | N | Hematopoietic system | |
| | DET | The | 11 |
| 14 | * | But | |
| 15 | * | They | |
| 16 | Adv | Equally | |
| 17 | V | Indicate | |
| | How | Equally | 16 |
| | Subject | They | 15 |
| | What | Signaling | 18 |
| | How | Signaling | 18 |
| | For | Specific actions | 21 |
| | Of | Differentiated cells | 24 |
| 18 | V | Signal | |
| | for | Specific actions | 21 |
| | of | Differentiated cells | 24 |
| 19 | Prep | For | |
| 21 | N | Specific actions | |
| | of | Differentiated cells | 24 |
| 22 | Prep | Of | |
| 24 | N | Differentiated cells | |

In a specific example of implementation, for each word, the lexical frame comprises the following information data elements: the word number, the morphological category and the word as it appeared in the sentence. In this example, the word number attributed to noun phrases is the number of the last word in the original sentence. Furthermore, words for which some syntactic dependencies were found have a plurality of dependency frame slots where dependent lexical frames are attached. Dependency frame slots (i.e. lines not starting with a number) contain 3 pieces of information: the Slot Name, the word as it appeared in the original sentence and the word number. The slot name is an abbreviation for the syntactic dependency found in the original parse tree. In this specific example, "Subject" is used for the "Subject"

Dependency, "What" is used for a Direct Object dependency, and a preposition is used to indicate any Prepositional Phrase dependency. The number and kind of slots in the lexical frame representation can vary according to the level of precision needed.

The list of lexical frames generated by the lexical frame generator contains a plurality of possible syntactic attachments between the words. The reader will readily observe that the same word is repeated at different places in the list of lexical frames. For instance in the above example, the noun phrase "clonal development", in addition to appearing in its respective lexical phrase (#9), is attached at 3 different places:

be—in clonal development
early indicators—in clonal development
growth—in clonal development The semantic extraction unit 602 receives from the lexical frame generator 600 the list of lexical frames and processes them on a basis of the set of information extraction rules received at the second input or stored in the semantic extraction unit 602.

Information records are obtained by matching the set of information extraction rules to lexical frames in the list of lexical frames. The information extraction unit 108 releases a list of information records with words or noun phrases from the original sentence attributed to different fields within the records.

Advantageously, making use of set of information extraction rules that operate on lexical frames rather than directly on the parse tree group will allow the set of information extraction rules to be represented in a simpler representation thereby allowing the definition of these rules. As a specific example, the "Treat" semantic frames given above for processing the set of trees can be rewritten for lexical frames as follows:

| Treat | V | | TREATMENT |
|---|---|---|---|
| SUBJECT | N | DISEASE: | DISEASE |
| *WITH | N | MEDICATION: | MEDICATION |
| *USING | N | MEDICATION: | MEDICATION |

The result of the process effected by the semantic extraction unit is a list of information records with words or noun phrases from the original sentence attributed to different fields within the records.

In a specific example, the following information record is obtained from the sentence "The patient's ear infection was treated using amoxycillin" by following the method presented here.

[TREATMENT DISEASE="ear infection" MEDICATION="amoxycillin"]

As a variant, depending on the characteristics of information extraction that is needed, the lexical frame generator 600 can be designed to generate simplified lexical representations by, for example:

(a) selecting a smaller subset of all dependency relations, and/or,
(b) combining different dependency relations.

The natural language information extraction system described in the specification can be implemented on any suitable hardware component including a processor programmed to implement the functionality of the processing unit 150 and a memory storage unit to store the data such as for example the morphological dictionary 200, the class-based contextual rules database 206, the semantic dictionary 400, the semantic rules database 450, the joining rules database 404 and the incompatibility rules database 410.

Figure 8:
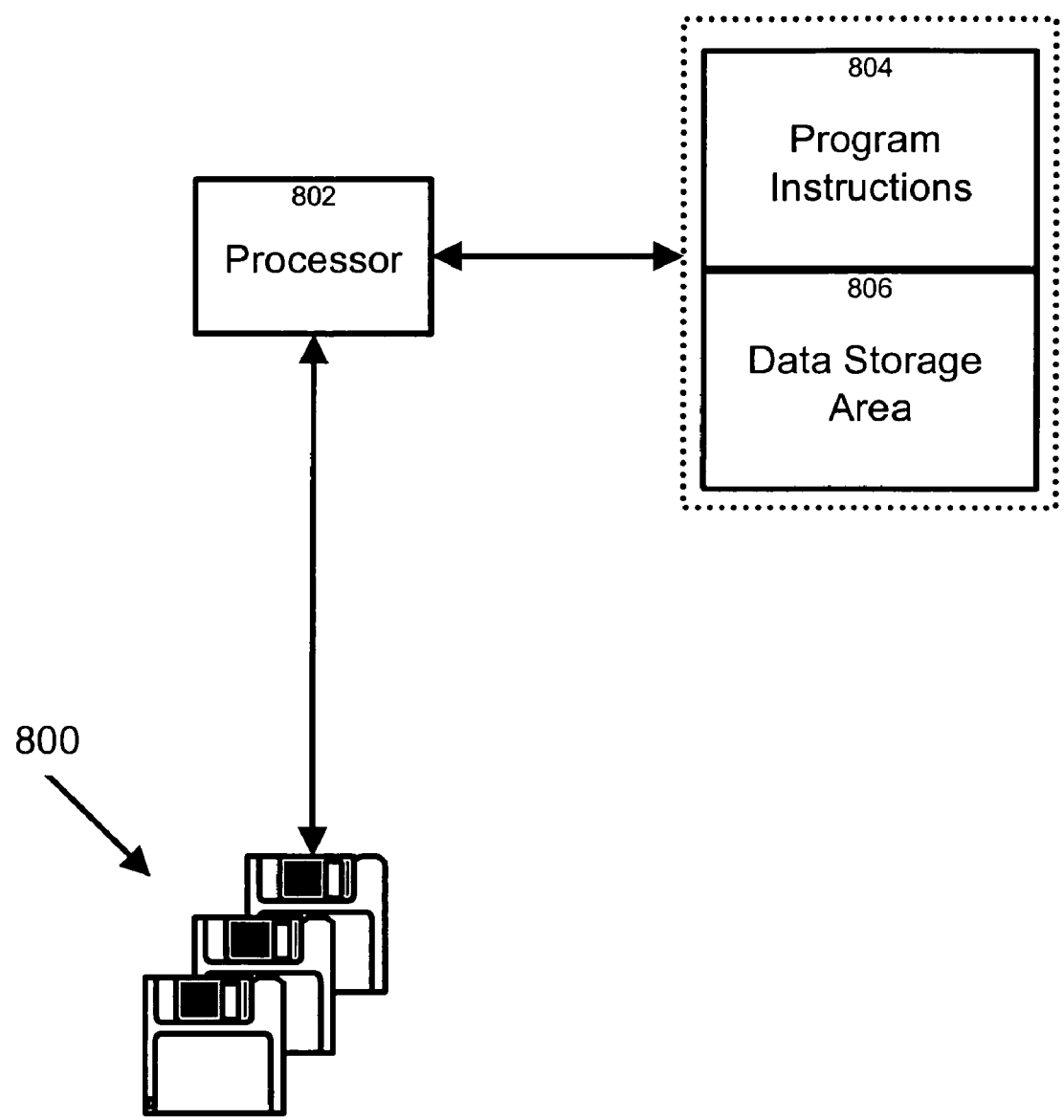
FIG. 8 is an apparatus implementing the natural language information extraction system.

The natural language information extraction system described in the specification can also be implemented on any suitable general purpose computing platform as depicted in FIG. 8 of the drawings. Such a computing platform typically includes a processor 802 and a memory 800 or computer readable medium connected to the processor 802 by a data communication bus. The memory 800 stores the data 806 and the instructions of the program element 804 implementing the functional blocks depicted in the drawings and described in the specification. In a specific example, the program element implements the processing unit 150. The program element operates on the textual representation of a sentence in accordance with the algorithms described above to generation information records on the basis of a set of information extraction rules using the techniques described in this specification.

Although the present invention has been described in considerable detail with reference to certain preferred embodiments thereof, variations and refinements are possible without departing from the spirit of the invention as have been described throughout the document. Therefore, the scope of the invention should be limited only by the appended claims and their equivalents.

What is claimed is:

1. A natural language information extraction system for deriving information from a textual representation of a sentence, the sentence having a plurality of words, said system comprising:

an input for receiving data elements indicative of the textual representation of the sentence;

a processing unit coupled to said input, said processing unit being operative for processing the textual representation of the sentence to derive:

a parse tree group including a plurality of parse trees, each parse tree in said parse tree group including a word of the sentence, at least one parse tree including at least two words of the sentence, said at least one parse tree including a dependency data element describing a syntactic relationship between the at least two words of the sentence, and;

at least one noun phrase associated to a semantic type;

said processing unit being operative for processing said parse tree group and said at least one noun phrase associated to a semantic type on the basis of a set of information extraction rules to derive an information record, the information record being indicative of a semantic representation of at least part of the sentence;

an output for releasing one or more data elements indicative of the information record.

2. A natural language information extraction system as defined in claim 1, wherein said processing unit comprises:

a morphological analyser for assigning to each word in the sentence a most likely morphological tag;

a syntactic processor coupled to the morphological analyser, said syntactic processor being operative for generating said parse tree group including a plurality of parse trees;

an information extraction unit for processing the plurality of parse trees to generate an information record on a basis of the set of information extraction rules.

3. A natural language information extraction system as defined in claim 2, wherein each information extraction rule in said set of information extraction rules includes a data element indicative of a parse tree pattern, said information extraction unit being operative to process the plurality of parse trees to extract a certain parse tree of said parse tree group, the certain parse tree matching the parse tree pattern.

4. A natural language information extraction system as defined in claim 2, wherein said morphological analyser is operative for:
   processing the textual representation of the sentence to assign a respective set of morphological tags to each word in the plurality of words;
   assigning to each word an ambiguity class at least in part on the basis of the respective set of morphological tags;
   identifying a most likely morphological tag to be associated to each word on the basis of a contextual rule, the contextual rule being associated to the respective ambiguity class assigned to each word.

5. A natural language information extraction system as defined in claim 2, wherein the syntactic processor is operative for:
   generating a parse tree for each word in the sentence and adding each generated parse tree to a parse tree group;
   generating a new parse tree on the basis of binary dependency rules applied to a given parse tree in the parse tree group, the new parse tree resulting from a combination of the given parse tree and another parse tree from the parse tree group;
   adding the new parse tree to the parse tree group.

6. A method for deriving information from a textual representation of a sentence, the sentence having a plurality of words, said method comprising:
   receiving data elements indicative of the textual representation of the sentence;
   processing the textual representation of the sentence to derive:
      a parse tree group including a plurality of parse trees, each parse tree in said parse tree group including a word of the sentence, at least one parse tree including at least two words of the sentence, said at least one parse tree including a dependency data element describing a syntactic relationship between the at least two words of the sentence, and;
      at least one noun phrase associated to a semantic type;
   processing the parse tree group on the basis of a set of information extraction rules and the at least one noun phrase associated to a semantic type to derive an information record, the information record being indicative of a semantic representation of at least part of the sentence.

7. A method as defined in claim 6, said method comprising:
   assigning to each word in the sentence a most likely morphological tag;
   processing the plurality of parse trees to generate an information record on a basis of the set of information extraction rules.

8. A method as defined in claim 7, wherein each information extraction rule in said set of information extraction rules includes a data element indicative of a parse tree pattern, said method comprising processing the plurality of parse trees to extract a certain parse tree of said parse tree group, the certain parse tree matching the parse tree pattern.

9. A method as defined in claim 7, wherein said method comprises:
   processing the textual representation of the sentence to assign a respective set of morphological tags to each word in the plurality of words;
   assigning to each word an ambiguity class at least in part on the basis of the respective set of morphological tags;
   identifying a most likely morphological tag to be associated to each word on the basis of a contextual rule, the contextual rule being associated to the respective ambiguity class assigned to each word.

10. A method as defined in claim 7, wherein said method comprises:
    generating a parse tree for each word in the sentence and adding each generated parse tree to a parse tree group;
    generating a new parse tree on the basis of binary dependency rules applied to a given parse tree in the parse tree group, the new parse tree resulting from a combination of the given parse tree and another parse tree from the parse tree group;
    adding the new parse tree to the parse tree group.

11. A computer readable medium comprising a program element suitable for execution by a computing apparatus for deriving information from a textual representation of a sentence, the sentence having a plurality of words, said computing apparatus comprising:
    a processor, said program element when executing on said processor being operative for:
       receiving data elements indicative of the textual representation of the sentence;
       processing the textual representation of the sentence to derive:
          a parse tree group including a plurality of parse trees, each parse tree in said parse tree group including a word of the sentence, at least one parse tree including at least two words of the sentence, said at least one parse tree including a dependency data element describing a syntactic relationship between the at least two words of the sentence, and;
          at least one noun phrase associated to a semantic type;
       processing the parse tree group and the at least one noun phrase associated to a semantic type on the basis of a set of information extraction rules to derive an information record, the information record being indicative of a semantic representation of at least part of the sentence;
       releasing one or more data elements indicative of the information record.

12. A computer readable medium as defined in claim 11, wherein said program element when executing on said processor being operative for implementation:
    a morphological analyser for assigning to each word in the sentence a most likely morphological tag;
    a syntactic processor coupled to the morphological analyser, said syntactic processor being operative for generating said parse tree group including a plurality of parse trees;
    an information extraction unit for processing the plurality of parse trees to generate an information record on a basis of the set of information extraction rules.

13. A computer readable medium as defined in claim 12, wherein each information extraction rule in said set of information extraction rules includes a data element indicative of a parse tree pattern, said information extraction unit being operative to process the plurality of parse trees to extract a certain parse tree of said parse tree group, the certain parse tree matching the parse tree pattern.

14. A computer readable medium as defined in claim 12, wherein said morphological analyser is operative for:
    processing the textual representation of the sentence to assign a respective set of morphological tags to each word in the plurality of words;

assigning to each word an ambiguity class at least in part on the basis of the respective set of morphological tags;

identifying a most likely morphological tag to be associated to each word on the basis of a contextual rule, the contextual rule being associated to the respective ambiguity class assigned to each word.

15. A computer readable medium as defined in claim 12, wherein the syntactic processor is operative for:

generating a parse tree for each word in the sentence and adding each generated parse tree to a parse tree group;

generating a new parse tree on the basis of binary dependency rules applied to a given parse tree in the parse tree group, the new parse tree resulting from a combination of the given parse tree and another parse tree from the parse tree group;

adding the new parse tree to the parse tree group.

16. An apparatus for parsing a textual representation of a sentence to derive a parse tree group including a plurality of parse trees, the sentence including a plurality of words, the apparatus comprising:

an input for receiving data elements indicative of the textual representation of the sentence;

a processing unit for processing the data elements indicative of the sentence to generate a parse tree group, said processing unit being operative for:

generating a parse tree for each word in the sentence and adding each generated parse tree to the parse tree group, wherein each parse tree in the parse tree group is formed of at least one node, and wherein all of the nodes that form the parse tree are associated to a word in the sentence;

generating a new parse tree on the basis of binary dependency rules applied to a given parse tree in the parse tree group, the new parse tree resulting from a combination of the given parse tree and another parse tree from the parse tree group;

adding the new parse tree to the parse tree group;

wherein at least one parse tree in the parse tree group includes at least two nodes, each node of said at least two nodes being associated to a respective word of the sentence, said at least one parse tree including a dependency data element describing a syntactic relationship between the words associated to said at least two nodes;

an output for releasing a signal indicative of the parse tree group, said parse tree group being in a format suitable to be processed to derive a semantic representation of at least part of the sentence at least in part on the basis of the parse tree group.

17. An apparatus as defined in claim 16, wherein said apparatus is further operative for:

extracting a given parse tree from the parse tree group, the given parse tree having a root node associated to a given word;

processing a second parse tree, the second parse tree having a root node associated to a word that is a precursor to the given word to derive a dependency data element resulting from a combination of the given parse tree and the second parse tree;

combining the given parse tree and the second parse tree at least in part on a basis of the dependency data element to generate the new parse tree.

18. An apparatus as defined in claim 17, wherein the given parse tree covers a first range of consecutive words in the sentence, the second parse tree covering a second range of consecutive words in the sentence, the second range of consecutive words being the immediate precursor of the first range of consecutive words in the sentence.

19. An apparatus as defined in claim 16, wherein said apparatus is further operative for:

extracting a given parse tree from the parse tree group, the given parse tree having a root node associated to a given word;

processing a second parse tree, the second parse tree having a root node associated to a word that is a successor to the given word to derive a dependency data element resulting from a combination of the given parse tree and the second parse tree;

combining the given parse tree and the second parse tree at least in part on the basis of the dependency data element to generate a new parse tree, the new parse tree forming the new parse tree.

20. An apparatus as defined in claim 16, wherein said apparatus is further operative for:

searching the parse tree group for a parse tree that matches the new parse tree;

when no matching parse tree is found, adding the new parse tree to the parse tree group.

21. A method for parsing a textual representation of a sentence to derive a parse tree group including a plurality of parse trees, the sentence including a plurality of words, said method comprising:

receiving data elements indicative of the sentence;

processing the data elements indicative of the sentence to generate a parse tree group by:

generating a parse tree for each word in the sentence and adding each generated parse tree to the parse tree group, wherein each parse tree in the parse tree group is formed of at least one node, and wherein all of the nodes that form the parse tree are associated to a word in the sentence, wherein at least one parse tree in the parse tree group includes at least two nodes, each node of said at least two nodes being associated to a respective word of the sentence, said at least one parse tree including a dependency data element describing a syntactic relationship between the words associated to said at least two nodes;

generating a new parse tree on the basis of binary dependency rules applied to a given parse tree in the parse tree group, the new parse tree resulting from a combination of the given parse tree and another parse tree from the parse tree group;

adding the new parse tree to the parse tree group, wherein the parse tree group is suitable to be processed to derive a semantic representation of at least part of the sentence at least in part on the basis of the parse tree group.

22. A computer readable medium comprising a program element suitable for execution by a computing apparatus for parsing a textual representation of a sentence to derive a parse tree group including a plurality of parse trees, the sentence including a plurality of words, said computing apparatus comprising:

a processor, said program element when executing on said processor being operative for:

receiving data elements indicative of the sentence;

generating a parse tree for each word in the sentence and adding each generated parse tree to a parse tree group, wherein each parse tree in the parse tree group is formed of at least one node, and wherein all of the nodes that form the parse tree are associated to a word in the sentence, wherein at least one parse tree in the parse tree group includes at least two nodes, each node of said at least two nodes being associated to a respective word of the sentence, said at least one parse tree including a dependency data element describing a syntactic relationship between the words associated to said at least two nodes;

generating a new parse tree on the basis of binary dependency rules applied to a given parse tree in the parse tree group, the new parse tree resulting from a combination of the given parse tree and another parse tree from the parse tree group;

adding the new parse tree to the parse tree group;

releasing a signal indicative of the parse tree group in a format suitable to be processed to derive a semantic representation of at least part of the sentence at least in part on the basis of the parse tree group.

23. A natural language information extraction system for deriving information from a textual representation of a sentence, the sentence having a plurality of words, said system comprising:

means for receiving data elements indicative of the textual representation of the sentence;

means for processing the textual representation of the sentence to derive:
a parse tree group including a plurality of parse trees, each parse tree in said parse tree group including a word of the sentence, at least one parse tree including at least two words of the sentence, said at least one parse tree including a dependency data element describing a syntactic relationship between the at least two words of the sentence, and;
at least one noun phrase associated to a semantic type;
said means for processing being operative for processing said parse tree group and said at least one noun phrase on the basis of a set of information extraction rules to derive an information record, the information record being indicative of a semantic representation of at least part of the sentence;

means for releasing the information record.

24. A natural language information extraction system for deriving information from a textual representation of a sentence, the sentence having a plurality of words, said system comprising:

an input for receiving data elements indicative of the textual representation of the sentence;

a processing unit coupled to said input, said processing unit being operative for processing the textual representation of the sentence to derive:
a parse tree group including a plurality of parse trees, wherein each parse tree in the parse tree group is formed from at least one node, all of the nodes forming the parse tree being associated to a word in the sentence, at least one parse tree including at least two words of the sentence, said at least one parse tree including a dependency data element describing a syntactic relationship between the at least two words of the sentence; said processing unit being operative for processing said parse tree group on the basis of a set of information extraction rules to derive an information record, the information record being indicative of a semantic representation of at least part of the sentence;

an output for releasing data elements indicative of the information record.

25. A natural language information extraction system as defined in claim 24, said processing unit being further operative for:

processing the textual representation of the sentence to derive a noun phrase including a set of words;

assigning to each word in the noun phrase a semantic type on the basis of entries in a semantics dictionary to derive a sequence of semantic typed words, the semantics dictionary including a plurality of entries, each entry being indicative of a word associated to at least one semantic type;

processing the sequence of semantic typed words on the basis of a set of semantic rules to derive a semantic type associated to the noun phrase, the set of semantic rules describing how to attach a semantic type to a given noun phrase;

releasing at an output said at least one noun phrase associated to a semantic type.

26. A natural language information extraction system as defined in claim 25, wherein the set of semantic rules includes at least one rule based on the presence of a semantic type associated to a word in the noun phrase.

27. A natural language information extraction system as defined in claim 25, wherein the set of semantic rules includes at least one rule based on the capitalization of words in the noun phrase.

28. A natural language information extraction system as defined in claim 25, wherein the set of semantic rules includes at least one rule based on the presence of specific words in the noun phrase.

29. A natural language information extraction system as defined in claim 25, wherein said at least one noun phrase is a first noun phrase and the semantic type of the at least one noun phrase is a first semantic type, said processing unit being further operative for:

processing a second noun phrase to derive a second semantic type associated to the second noun phrase;

combining the first noun phrase with the second noun phrase to derive a compound noun phrase on the basis of joining rules;

assigning a third semantic type to the compound noun phrase;

releasing a signal indicative of the compound noun phrase associated with the third semantic type.

30. A natural language information extraction system as defined in claim 29, wherein said joining rules are based on either one of the first semantic type and the second semantic type.

31. A natural language information extraction system as defined in claim 29, wherein said joining rules are based on the semantic types of words in either one of the first noun phrase and the second noun phrase.

32. A natural language information extraction system as defined in claim 29, wherein said joining rules are based on specific words in either one of the first noun phrase and the second noun phrase.

33. A natural language information extraction system as defined in claim 29, wherein said processing unit is further operative for processing the compound noun phrase on the basis of the occurrence of incompatible semantic types within the compound noun phrase.

34. A natural language information extraction system for deriving information from a textual representation of a sentence, the sentence having a plurality of words, said system comprising:

an input for receiving data elements indicative of the textual representation of the sentence;

a processing unit coupled to said input, said processing unit being operative for:

generating a parse tree group including a plurality of parse trees, each parse tree in said parse tree group including a word of the sentence, at least some parse trees including at least two words of the sentence and a data element indicative of the syntactic dependencies between the at least two words;

generating on the basis of the parse tree group a plurality of lexical frames, each lexical frame being associated to a respective word in the sentence, a certain lexical frame being associated to a certain word in the sentence and comprising a list of words of the sentence other than the certain word, each word in the list of words being associated to a dependency data element indicative of the syntactic relationship of each word in the list of words with the certain word;

processing said plurality of lexical frames on the basis of a set of information extraction rules to derive an information record being indicative of a semantic representation of at least part of the sentence;

an output for releasing data elements indicative of the information record.

* * * * *